United States Patent
Takayanagi

(10) Patent No.: US 6,705,760 B2
(45) Date of Patent: Mar. 16, 2004

(54) SPINDLE MOTOR AND BEARING ASSEMBLY

(75) Inventor: Shin-ichi Takayanagi, Miyota-machi (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/196,171

(22) Filed: Jul. 17, 2002

(65) Prior Publication Data
US 2002/0180290 A1 Dec. 5, 2002

Related U.S. Application Data

(62) Division of application No. 09/861,646, filed on May 22, 2001.

(30) Foreign Application Priority Data

Jan. 31, 2001 (JP) ........................................ 2001-024026

(51) Int. Cl.$^7$ ............................................... F16C 32/06
(52) U.S. Cl. ....................... 384/100; 384/114; 384/537
(58) Field of Search ............................... 384/100, 114, 384/537, 513, 543

(56) References Cited

U.S. PATENT DOCUMENTS

| | | | | |
|---|---|---|---|---|
| 3,506,317 A | * | 4/1970 | De Angeli | 384/542 |
| 4,229,058 A | * | 10/1980 | Arrowsmith et al. | 384/99 |
| 4,607,182 A | | 8/1986 | Ballhaus | 310/90 |
| 4,620,805 A | * | 11/1986 | Belanger | 384/257 |
| 4,713,704 A | | 12/1987 | Voll et al. | 360/97 |
| 5,135,314 A | * | 8/1992 | Momose et al. | 384/275 |
| 5,341,569 A | | 8/1994 | Takamizawa et al. | 29/898.09 |
| 5,399,025 A | * | 3/1995 | Higuchi et al. | 29/898.07 |
| 5,426,548 A | * | 6/1995 | Fujii et al. | 360/98.08 |
| 5,509,198 A | | 4/1996 | Takamizawa et al. | 29/898.09 |
| 5,634,724 A | | 6/1997 | Zang et al. | 384/107 |
| 5,658,080 A | * | 8/1997 | Ichiyama | 384/112 |
| 5,659,445 A | * | 8/1997 | Yoshida et al. | 310/90 |
| 5,707,154 A | * | 1/1998 | Ichiyama | 384/107 |
| 5,791,784 A | * | 8/1998 | Ichiyama | 384/107 |
| 5,941,644 A | * | 8/1999 | Takahashi | 384/112 |
| 6,016,238 A | * | 1/2000 | Yoshikawa et al. | 360/98.07 |
| 6,055,126 A | * | 4/2000 | Kennedy et al. | 360/99.08 |
| 6,271,612 B1 | * | 8/2001 | Tanaka et al. | 310/90 |

FOREIGN PATENT DOCUMENTS

EP 0 938 088 A2 2/1999

* cited by examiner

Primary Examiner—David A. Bucci
Assistant Examiner—Julie K. Smith
(74) Attorney, Agent, or Firm—Lorusso, Loud & Kelly

(57) ABSTRACT

The fixed shaft type spindle motor of the invention has a fixed shaft vertically installed on a base and a rotor hub supported to freely rotate by the fixed shaft through a bearing. The bearing is composed of a compound ball bearing, and a larger diameter portion of a stepped top-form connection member having the larger diameter portion and a smaller diameter portion is fixedly engaged with the upper end of the outer ring of the compound ball bearing. And, the smaller diameter portion of the connection member is fastened to the rotor hub. The rotary shaft type spindle motor has a rotary shaft vertically installed on the rotor hub, in which the rotary shaft is supported to freely rotate on the base through the bearing. The bearing is composed of a compound ball bearing, and the larger diameter portion of the stepped top-form connection member having the larger diameter portion and the smaller diameter portion is fixedly engaged with the lower end of the outer ring of the compound ball bearing. And, the smaller diameter portion of the connection member is fastened to the base. The compound ball bearing, the shaft (the fixed shaft, the rotary shaft), and the connection member may be assembled in advance integrally in one unit, and the compound ball bearing may be replaced by a fluid bearing. The above configuration will enhance the reliability of the run-out accuracy/NRR0, the noises, the acoustic life, and the rigidity etc., of the spindle motor, and reduce the manufacturing cost.

4 Claims, 11 Drawing Sheets

SPINDLE MOTOR AND BEARING ASSEMBLY

CROSS-REFERENCE TO RELATED APPLICATION

This application is a division of U.S. Ser. No. 09/861,646 filed May 22, 2001, pending.

BACKGROUND OF THE INVENTION

1. Field of the Invention

The present invention relates to a spindle motor and a bearing assembly for use in office automation equipment such as a computer and peripheral equipment thereof as a driving device/component for the rotating mechanism thereof, specifically to the spindle motor and the bearing assembly that achieve to enhance the run-out accuracy/nonrepeatable runout (NRR0) of a motor, and the reliability of the noises, acoustic life, and rigidity, etc.

2. Description of the Prior Art

The spindle motor for driving a magnetic disk on a hard disk drive as a peripheral equipment of a computer is classified broadly into two types in terms of the structure: the fixed shaft type in which a fixed shaft is installed upright on a base, and a rotor hub is supported to freely rotate by the fixed shaft through a bearing interposed between the fixed shaft and the rotor hub; and the rotary shaft type in which a rotary shaft is vertically installed on a rotor hub, and the rotary shaft is supported to freely rotate on a base through a bearing interposed between the rotary shaft and the base.

Generally, the fixed shaft type is provided with, as shown in FIG. 9, a base (flange) 02, a fixed shaft 010 that is installed upright on the base 02, a rotor hub (hub member) 03 that rotates relatively to the base 02, and a bearing means 04 interposed between the fixed shaft 010 and the rotor hub 03. A recording medium such as a magnetic disk (not shown) is mounted on the rotor hub 03. A stator 015 is installed on the outer peripheral surface of an inner cylindrical wall 014 of the base 02, and a permanent magnet 016 is installed on the inner peripheral surface of an outer circumferential wall 013 of the rotor hub 03 so as to face the outer peripheral surface of the stator 015. The symbol 017 denotes a feeder part to the windings of the stator 015, which is connected to a flexible printed circuit board 037.

The bearing means 04 employs a compound ball bearing, and an inner ring 06 thereof is applied from the outside to the fixed shaft 010 to be fixedly engaged with the shaft, and an outer ring 05 thereof is applied from the inside to the inner peripheral surface of an inner circumferential wall 032 of the rotor hub 03 to be fixedly engaged with the wall. A part of the inner ring 06 can be formed integrally with the fixed shaft 010 according to circumstances, as shown in FIG. 9; and the outer ring 05 can be formed commonly integrally throughout the whole structure of the compound ball bearing in certain cases, as shown in the same figure.

The rotary shaft type is also provided with, as shown in FIG. 10, the base (flange) 02, the rotor hub (hub member) 03 that rotates relatively to the base, a rotary shaft 020 that is vertically installed on the rotor hub 03, and the bearing means 04 interposed between the rotary shaft 020 and the base 02. The recording medium such as a magnetic disk (not shown) is mounted on the rotor hub 03. The stator 015 is installed on the outer peripheral surface of the inner cylindrical wall 014 of the base 02, and the permanent magnet 016 is installed on the inner peripheral surface of the outer circumferential wall 013 of the rotor hub 03 so as to face the outer peripheral surface of the stator 015. The symbol 017 denotes the feeder part to the windings of the stator 015, which is connected to a flexible printed circuit board 037.

The bearing means 04 employs a compound ball bearing, and the inner ring 06 thereof is applied from the outside to the rotary shaft 020 to be fixedly engaged with the shaft, and the outer ring 05 thereof is applied from the inside to the inner peripheral surface of the cylindrical wall 014 of the base 02 to be fixedly engaged with the wall. A part of the inner ring 06 can be formed integrally with the rotary shaft 020 according to circumstances, as shown in FIG. 10; and the outer ring 05 can be formed commonly integrally throughout the whole structure of the compound ball bearing in certain cases, as shown in the same figure.

In a certain case, the rotor hub 03 and the rotary shaft 020 each manufactured separately can be assembled in a unit, as shown in FIG. 10; and in another case, they can be manufactured in an integral unit from the beginning. In the latter case, a part of the inner ring 06 cannot be formed integrally with the rotary shaft 020.

In any type of the spindle motor 01, the rotor hub 03 thereof is supported on the base 02 to freely rotate through the compound ball bearing 04 as a rolling bearing interposed between the base 02 and the rotor hub 03. And, the inner ring 06 of the compound ball bearing 04 is applied from the outside to the fixed shaft 010 vertically installed on the base 02 or to the rotary shaft 020 vertically installed on the rotor hub 03 to be fixedly engaged therewith. The outer ring 05 thereof is applied from the inside to the inner peripheral surface of the inner circumferential wall 032 of the rotor hub 03 or to the inner peripheral surface of the inner cylindrical wall 014 of the base 02 to be fixedly engaged therewith.

Now, the recent demand in the hard disk drive shows a remarkable tendency to increase the recording capacity, to enhance the impact resistance, to lower the noises, to increase the data access speed, and so forth. In order to answer these requirements, the rolling bearing of a spindle motor has gone through improvements of the material composition, enhancements of the working precision of the inner and outer rings and rolling elements, etc.

However, when the inner and outer rings and the balls (rolling elements) are made of the steels such as the bearing steels, there occur metal contacts between the rolling surfaces of the inner and outer rings and the surfaces of the balls, which effects galling and wearing to deteriorate the acoustic characteristic, leading to the problem of the acoustic life (recently, the life of the spindle motor is evaluated not by the fatigue life, but by the acoustic life). Further, there occur fretting corrosions (impressions, dilapidated surfaces) on the rolling surfaces due to shocks and vibrations during transportation, which also deteriorates the acoustic life and the precision of rotation.

Especially in recent years, the rotational speed of a spindle motor is increased to higher than 7200 rpm, and the rotating sound of the motor becomes increased to that degree, which tends to shorten the acoustic life. Also in future, a still more increase of the recording capacity is estimated in view of the demand of recording video images and so forth. In order to answer such demands and future problems estimated, the foregoing improvements of the material composition and enhancements of the working precision and the like will not be sufficient for the countermeasure.

In recent years, the ball materials have been tested and examined which exceed in the non-agglutination property and the wear resistance, and the nitride silicon ceramics has been adopted as the rolling element material. There have been discussions about the limitation of the rolling bearing itself, including the ceramic ball bearing made of such new materials, and it has been put forward to employ the fluid bearing in order to solve these problems.

FIG. 11 illustrates a rotary shaft type spindle motor 01 with such a fluid bearing loaded. This spindle motor 01 is provided with the base (flange) 02, the rotor hub (hub member) 03 that rotates relatively to the base 02, a rotary shaft 020 that is vertically installed on the rotor hub 03, and a fluid bearing 030 interposed between the rotary shaft 020 and the base 02.

A sleeve 031 of the fluid bearing 030 sheathes the rotary shaft 020, and is applied to the inner peripheral surface of the inner cylindrical wall 014 of the base 02 to be fixedly engaged with the wall. A lubricating oil is supplied into the sliding area between the sleeve 031 and the rotary shaft 020, and herringbones (<-shaped grooves) 033 formed on the circumferential surface of the rotary shaft 020 effect to raise the pressure of the lubricating oil, along with the rotation of the rotary shaft 020, which floats the rotary shaft 020 up from the sleeve 031.

Although not detailed in the drawing, similar herringbones are formed on an edge surface of a thrust ring 034 fixedly engaged with the lower part of the rotary shaft 020, and a lubricating oil is supplied into a gap between the edge surface and an inner surface of a counter plate 037 fixedly engaged with the lower end of the sleeve 031. And, as the rotary shaft 020 turns, the herringbones effect to raise the pressure of the lubricating oil, which makes the counter plate 037 receive the thrust that acts on the rotary shaft 020.

Therefore, the base 02 supports the rotary shaft 020 of the rotor hub 03 to freely rotate through the fluid bearing 030 interposed therebetween. The other structure of the motor is basically identical to the spindle motor having the compound ball bearing used therein.

On the other hand, in the fixed shaft type spindle motor with a fluid bearing loaded, which is not illustrated, the sleeve 031 of the fluid bearing 030 is fit to an inner peripheral surface of a wall formed on the rotor hub 03, and a fixed shaft is installed upright on the base 02. And, this fixed shaft is sheathed with the sleeve 031. Therefore, the fixed shaft supports the rotor hub 03 to freely rotate through the fluid bearing 030 interposed therebetween.

Even though either the ball bearing or the fluid bearing is used, and even though the spindle motor is the fixed shaft type or the rotary shaft type, the installation of the bearing in the spindle motor is carried out by any one of the methods: press fitting to the counterpart (rotating components and fixed components), adhesion by adhesives, and press-fit adhesion using both of these.

In case of the press fitting method, the shape precision (circularity, cylindricality, surface roughness) of the inner or outer peripheral surface of the counterpart gives influence to transfer the shape from the outer peripheral surface of the outer ring and the inner peripheral surface of the inner ring of the rolling bearing to the rolling surfaces of the inner and outer rings, or to deform the rolling surfaces of the inner and outer rings. Also, the external stress caused by a press fitting propagates through the outer peripheral surface of the outer ring or through the inner peripheral surface of the inner ring, and produces permanent deformations on the rolling surfaces of the inner and outer rings through the rolling elements to give impressions thereon, which deteriorates the reliability of the run-out accuracy/NRRO, the noises, and the acoustic life, etc., of the motor. In the fluid bearing, the clearance between the sleeve and the shaft sheathed with the sleeve varies, which varies the rigidity.

And, in case of the adhesion, the stress is produced when the adhesive is hardened, which deforms the bearing, also deteriorating the reliability of the run-out accuracy, the noises, and the acoustic life of the motor, and so forth. Further, in the rotary shaft type spindle motor, the assembly of the stator 015 on the outer peripheral surface of the cylindrical wall 014 of the base 02 gives influence to deteriorate the accuracy of the inner diameter of the cylindrical wall 014, which brings about deterioration of the bearing accuracy.

Further, in case of the foregoing press fitting, adhesion, or press-fit adhesion being adopted as the method of mounting the bearing, an adhesion groove (refer to adhesion groove 040 in FIG. 9, adhesion groove 041 in FIG. 10) for filling adhesives and a run-off groove are needed on the bearing mounting surface on the side of the counterpart, which increases the man-hour to that extent, leading to cost increase.

SUMMARY OF THE INVENTION

The present invention has been made in view of the foregoing circumstances, and it is an object of the invention to provide a spindle motor and a bearing assembly that achieve to resolve the foregoing problems of the conventional spindle motor, to remove bad influences on the precision of the rolling surfaces of the inner and outer rings through the outer peripheral surface of the outer ring and the inner peripheral surface of the inner ring of the bearing, by the stress resulting from the shape precision (circularity, cylindricality, surface roughness) of the inner or outer peripheral surface of the counterpart in mounting the bearing, or the stress caused by the press fitting, adhesion, or press-fit adhesion as the method of mounting the bearing, to enhance the reliability of the run-out accuracy/NRRO, the noises, and the acoustic life, etc., of the spindle motor, and to reduce the manufacturing cost thereof.

According to the first aspect of the invention, the spindle motor to resolve the above problems is a fixed shaft type spindle motor in which a fixed shaft is vertically installed on a base and a rotor hub is supported to freely rotate by the fixed shaft through a bearing, wherein the bearing is a compound ball bearing, a larger diameter portion of a stepped top-form connection member having the larger diameter portion and a smaller diameter portion is fixedly engaged with an upper end of an outer ring of the compound ball bearing, and the smaller diameter portion of the connection member is fastened to the rotor hub.

Therefore, when the bearing is composed of the compound ball bearing, the outer ring of the compound ball bearing is to be fastened to the rotor hub through the connection member.

As a result, the rotor hub (the component on the rotating side) being one of the two counterparts (the component on the rotating side and the component on the fixing side) that mount the compound ball bearing can be made up without the inner peripheral surface of a wall, which has conventionally been regarded as necessary to fit the outer ring of the compound ball bearing thereto. Therefore, there does not exist the stress resulting from the shape precision (circularity, cylindricality, surface roughness) of the inner peripheral surface of the wall, or the stress caused by the press fitting, adhesion, or press-fit adhesion as the method of mounting the bearing; accordingly disappear bad influences on the precision of the rolling surfaces of the inner and outer rings through the outer peripheral surface of the outer ring of the bearing, thereby enhancing the reliability of the run-out accuracy/NRR0, the noises, and the acoustic life, etc., of the spindle motor.

Further, since the rotor hub being the one of the two counterparts that mount the compound ball bearing can be configured without the inner peripheral surface of the wall, which has conventionally been regarded as necessary to fit the outer ring of the compound ball bearing thereto, the adhesion groove (the groove for filling adhesives) and the run-off groove that are formed conventionally on the inner peripheral surface of the wall become unnecessary, thereby reducing the man-hour to lower the manufacturing cost.

According to the second aspect of the invention, there is provided a fixed shaft type spindle motor in which a fixed shaft is vertically installed on a base and a rotor hub is supported to freely rotate by the fixed shaft through a bearing, wherein the bearing is a fluid bearing, a larger diameter portion of a stepped top-form connection member having the larger diameter portion and a smaller diameter portion is fixedly engaged with an upper end of a sleeve of the fluid bearing, and the smaller diameter portion of the connection member is fastened to the rotor hub.

Therefore, when the bearing is composed of the fluid bearing, the sleeve of the fluid bearing is to be fastened to the rotor hub through the connection member.

As a result, the rotor hub (the component on the rotating side) being one of the two counterparts (the component on the rotating side and the component on the fixing side) that mount the fluid bearing can be made up without the inner peripheral surface of a wall, which has conventionally been regarded as necessary to fit the sleeve of the fluid bearing thereto. Therefore, there does not exist the stress resulting from the shape precision (circularity, cylindricality, surface roughness) of the inner peripheral surface of the wall, or the stress caused by the press fitting, adhesion, or press-fit adhesion as the method of mounting the bearing; accordingly disappear bad influences on the precision of the sliding surfaces of the sleeve and the fixed shaft and the clearance between the sliding surfaces of the two through the outer peripheral surface of the sleeve of the bearing, thereby enhancing the reliability of the run-out accuracy/NRR0, the noises, the acoustic life, and the rigidity, etc., of the spindle motor.

Further, since the rotor hub being the one of the two counterparts that mount the fluid bearing can be configured without the inner peripheral surface of the wall, which has conventionally been regarded as necessary to fit the sleeve of the fluid bearing thereto, the adhesion groove and the run-off groove that are formed conventionally on the inner peripheral surface of the wall become unnecessary, thereby reducing the man-hour to lower the manufacturing cost.

According to the third aspect of the invention, there is provided a rotary shaft type spindle motor in which a rotary shaft is vertically installed on a rotor hub and the rotary shaft is supported to freely rotate on a base through a bearing, wherein the bearing is a compound ball bearing, a larger diameter portion of a stepped top-form connection member having the larger diameter portion and a smaller diameter portion is fixedly engaged with a lower end of an outer ring of the compound ball bearing, and the smaller diameter portion of the connection member is fastened to the base.

Therefore, when the bearing is composed of the compound ball bearing, the outer ring of the compound ball bearing is to be fastened to the base through the connection member.

As a result, the base (the component on the fixing side) being the other one of the two counterparts (the component on the rotating side and the component on the fixing side) that mount the compound ball bearing can be made up without the inner peripheral surface of a wall, which has conventionally been regarded as necessary to fit the outer ring of the compound ball bearing thereto. Therefore, there does not exist the stress resulting from the shape precision (circularity, cylindricality, surface roughness) of the inner peripheral surface of the wall, or the stress caused by the press fitting, adhesion, or press-fit adhesion as the method of mounting the bearing; accordingly disappear bad influences on the precision of the rolling surfaces of the inner and outer rings through the outer peripheral surface of the outer ring of the bearing, thereby enhancing the reliability of the run-out accuracy/NRR0, the noises, and the acoustic life, etc., of the spindle motor.

Further, since the base being the other one of the two counterparts that mount the compound ball bearing can be configured without the inner peripheral surface of the wall, which has conventionally been regarded as necessary to fit the outer ring of the compound ball bearing thereto, the adhesion groove and the run-off groove that are formed conventionally on the inner peripheral surface of the wall become unnecessary, thereby reducing the man-hour to lower the manufacturing cost.

According to the fourth aspect of the invention, there is provided a rotary shaft type spindle motor in which a rotary shaft is vertically installed on a rotor hub, and the rotary shaft is supported to freely rotate on a base through a bearing, wherein the bearing is a fluid bearing, a larger diameter portion of a stepped top-form connection member having the larger diameter portion and a smaller diameter portion is fixedly engaged with a lower end of a sleeve of the fluid bearing, and the smaller diameter portion of the connection member is fastened to the base.

Therefore, when the bearing is composed of the fluid bearing, the sleeve of the fluid bearing is to be fastened to the base through the connection member.

As a result, the base (the component on the fixing side) being the other one of the two counterparts (the component on the rotating side and the component on the fixing side) that mount the fluid bearing can be made up without the inner peripheral surface of a wall, which has conventionally been regarded as necessary to fit the sleeve of the fluid bearing thereto. Therefore, there does not exist the stress resulting from the shape precision (circularity, cylindricality, surface roughness) of the inner peripheral surface of the wall, or the stress caused by the press fitting, adhesion, or press-fit adhesion as the method of mounting the bearing; accordingly disappear bad influences on the precision of the sliding surfaces of the sleeve and the fixed shaft and the clearance between the sliding surfaces of the two through the outer peripheral surface of the sleeve of the bearing, thereby enhancing the reliability of the run-out accuracy/ NRR0, the noises, the acoustic life, and the rigidity, etc., of the spindle motor.

Further, since the base being the other one of the two counterparts that mount the fluid bearing can be configured without the inner peripheral surface of the wall, which has conventionally been regarded as necessary to fit the sleeve of the fluid bearing thereto, the adhesion groove and the run-off groove that are formed conventionally on the inner peripheral surface of the wall become unnecessary, thereby reducing the man-hour to lower the manufacturing cost.

Further, according to the fifth aspect of the invention, the bearing assembly to resolve the foregoing problems is a bearing assembly in which an inner ring of a compound ball bearing with a pressurization applied is fixedly engaged with a shaft, and a larger diameter portion of a stepped top-form connection member having the larger diameter portion and a smaller diameter portion is fixedly engaged with any of ends of an outer ring of the compound ball bearing.

Therefore, since the bearing assembly according to the fifth aspect of the invention is made up as above, the compound ball bearing, the shaft, and the connection member are assembled in advance into one assembly unit. As a result, fastening the shaft to the one of the two counterparts (the component on the rotating side and the component on the fixing side) that mount the bearing assembly and fastening the smaller diameter portion of the connection member to the other one will achieve to assemble the compound ball bearing between the two counterparts, and thus the mounting work of the compound ball bearing becomes extremely easy to perform.

And, according to the sixth aspect of the invention, there is provided a bearing assembly in which a sleeve of a fluid bearing sheathes a shaft, and a larger diameter portion of a stepped top-form connection member having the larger diameter portion and a smaller diameter portion is fixedly engaged with any of ends of the sleeve.

Therefore, since the bearing assembly according to the sixth aspect of the invention is made up as above, the sleeve of the fluid bearing, the shaft, and the connection member are assembled in advance into one assembly unit. As a result, fastening the shaft to the one of the two counterparts (the component on the rotating side and the component on the fixing side) that mount the bearing assembly and fastening the smaller diameter portion of the connection member to the other one will achieve to assemble the fluid bearing between the two counterparts, and thus the mounting work of the fluid bearing becomes extremely easy to perform.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
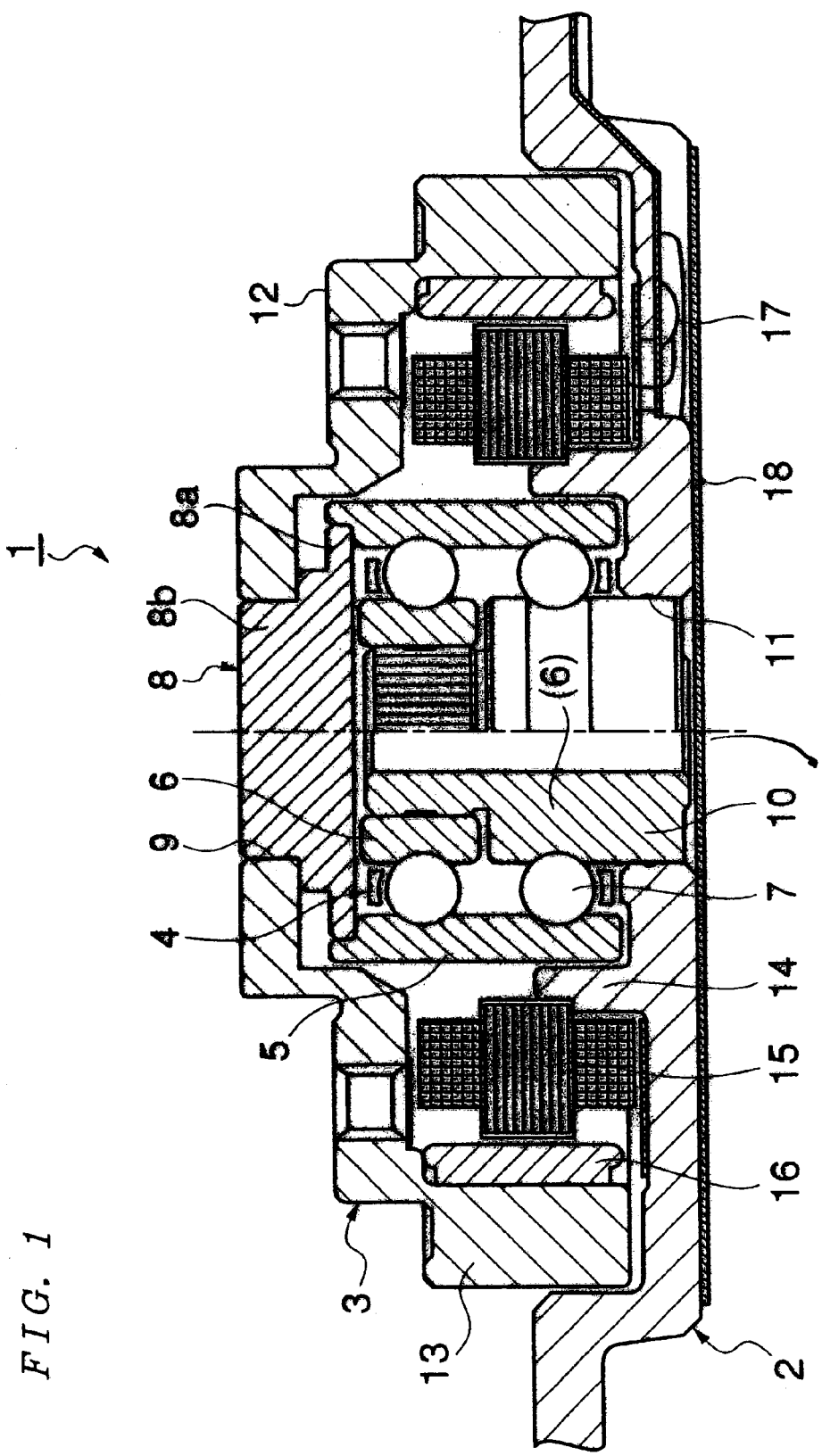
FIG. 1 is a sectional view of a fixed shaft type spindle motor in the first embodiment of the invention.

The first embodiment of the invention will be described with reference to FIG. 1 and FIG. 2. FIG. 1 is a sectional view of a fixed shaft type spindle motor of the first embodiment, and FIG. 2 is an exploded view of the same.

Figure 2:
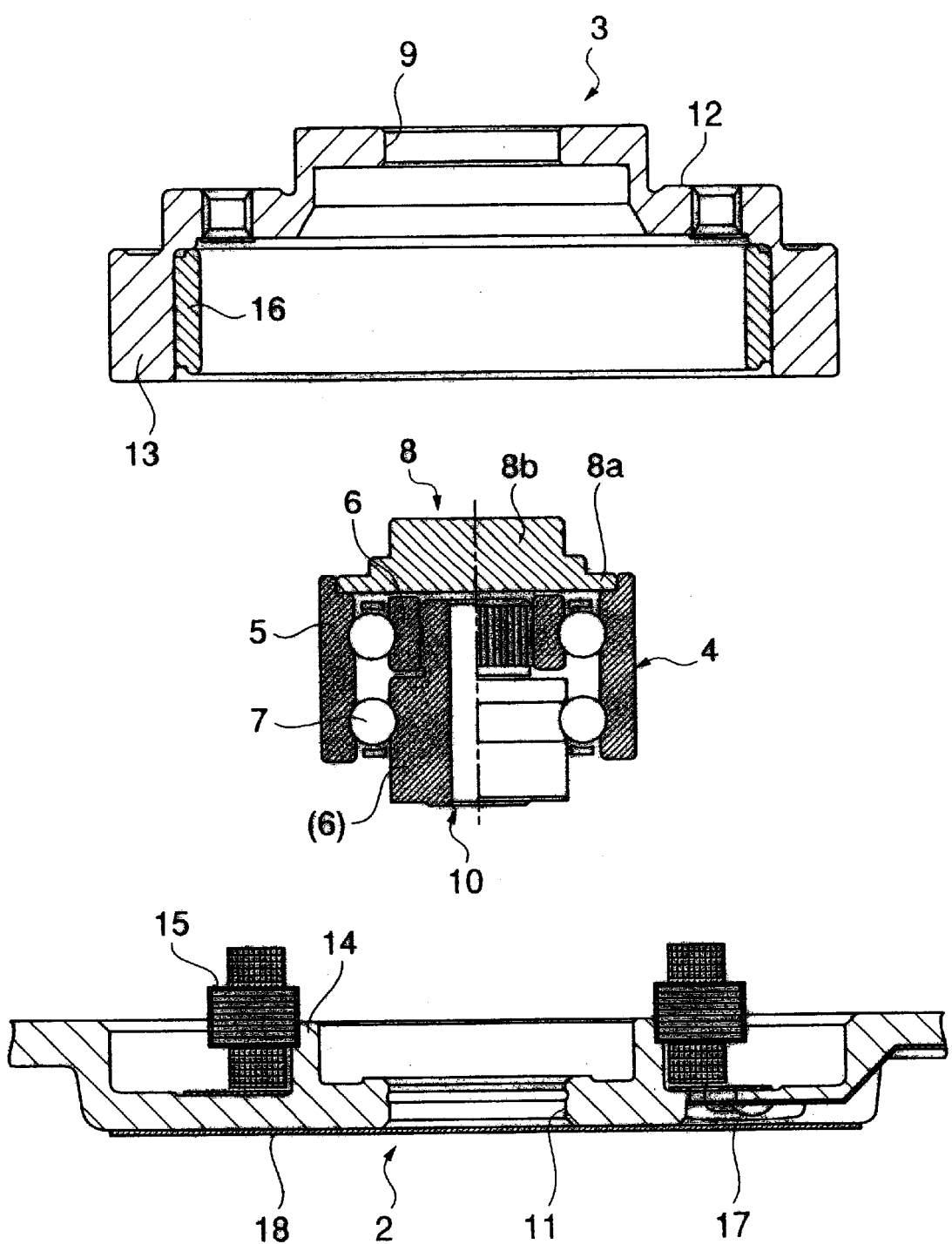
FIG. 2 is an exploded view of the same.

As shown in FIG. 1 and FIG. 2, a fixed shaft type spindle motor 1 relating to the first embodiment has a fixed shaft 10 installed upright (vertically upward) on a flange base 2, in which the fixed shaft 10 is fixedly engaged with a central circular hole 11 on the flange base 2. An inner ring 6 of an upper half unit ball bearing portion of a compound ball bearing 4 is applied from the outside to the upper reduced diameter portion of the fixed shaft 10 in FIG. 1 to be fixedly engaged therewith. The inner ring 6 (the portion illustrated by (6) in the drawing) of a lower half unit ball bearing portion of the compound ball bearing 4 is formed integrally with the fixed shaft 10. Here, the "unit ball bearing portion of the compound ball bearing" signifies a ball bearing portion by each stage, when plural balls (rolling elements) contained between the inner and outer rings with plural stages in the axial direction are virtually partitioned into each stage.

An outer ring 5 of the compound ball bearing 4 is formed commonly integrally throughout the whole structure of the compound ball bearing 4. On the upper end of the outer ring 5 is formed a step portion made by enlarging the inner diameter thereof. A larger diameter portion 8a of a stepped top-form connection member 8 (without a rotary shaft) having the larger diameter portion 8a and a smaller diameter portion 8b is fixedly engaged with the step portion formed on the upper end of the outer ring 5 with the larger diameter portion 8a applied from the inside to the step portion. The smaller diameter portion 8b of the connection member 8 is fixedly engaged with a central circular hole 9 of a rotor hub 3 with the smaller diameter portion 8b applied from the inside to the central circular hole 9.

Figure 9:
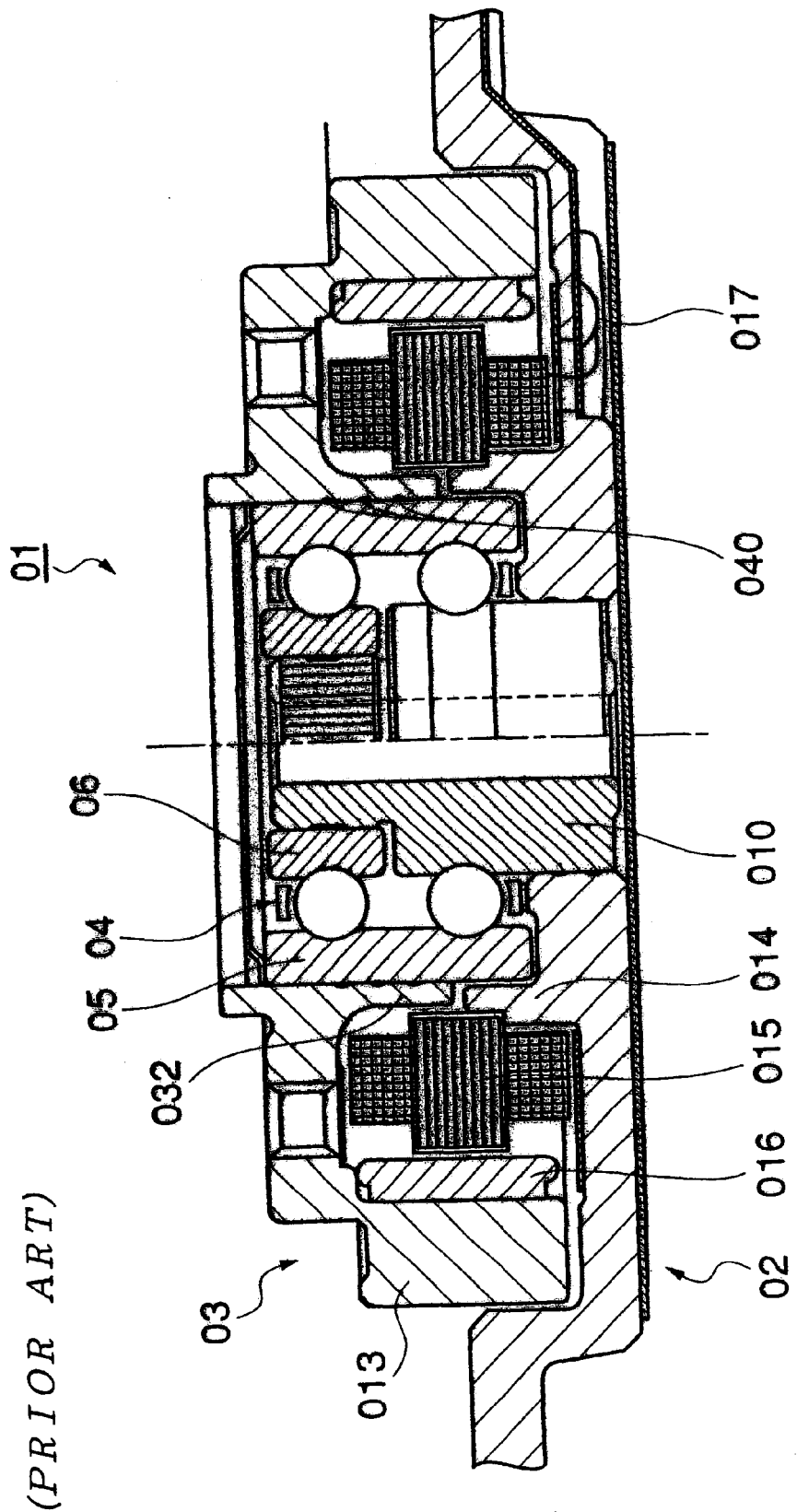
FIG. 9 is a sectional view of a conventional fixed shaft type spindle motor using the compound ball bearing.

Therefore, since the rotor hub 3, connection member 8, and the outer ring 5 of the compound ball bearing 4 are coupled in one unit, the rotor hub 3 is supported to freely rotate by the fixed shaft 10 of the base 2 through the connection member 8 and the compound ball bearing 4. And, since the outer ring 5 of the compound ball bearing 4 is fixed to the rotor hub 3 through the connection member 8, an inner peripheral surface of a wall (refer to the inner peripheral surface of the inner circumferential wall 032 of the rotor hub 03 in FIG. 9), which has conventionally been regarded as necessary to fit the outer ring 5 of the compound ball bearing 4 to the rotor hub 3, becomes unnecessary, so that the rotor hub 3 is not provided with such inner peripheral surface.

A magnetic disk (not shown) is mounted on a mounting plane 12 of the rotor hub 3. The other rotating bodies requiring a high run-out accuracy/NRR0 and/or low noises can be mounted thereon.

Plural balls (rolling elements) 7 are accommodated in a pressurized state between the outer ring 5 and the inner ring 6, which are arrayed in the circumferential direction with a vertical two-stage configuration. The balls 7 travel on concave rolling surfaces that are formed to face each other on the inner peripheral surface of the outer ring 5 and on the outer peripheral surface of the inner ring 6, while rolling relatively to the outer ring 5 and the inner ring 6.

A stator 15 is fit onto the outer peripheral surface of an inner cylindrical wall 14 of the base 2, and a permanent magnet 16 is mounted circumferentially on the inner peripheral surface of an outer circumferential wall 13 of a larger diameter portion of the rotor hub 3 so as to face the outer peripheral surface of the stator 15. The symbol 17 denotes a feeder part to the windings of the stator 15, which is connected to a flexible printed circuit board 37. The symbol 18 denotes a plaque.

In the first embodiment, the fixed shaft 10, the compound ball bearing 4, and the connection member 8 are integrally assembled in advance as a product, as shown in FIG. 2. With the bearing assembly thus produced, the projected end of the fixed shaft 10 thereof is fixedly engaged with the central circular hole 11 of the base 2, and the smaller diameter portion 8b of the connection member 8 is fixedly engaged with the central circular hole 9 of the rotor hub 3, whereby the fixed shaft type spindle motor 1 of the first embodiment is made up.

As the first embodiment is configured as above, when the power is supplied from the feeder part 17 connected to the flexible printed circuit board 37 to the windings of the stator 15, according to the principle of the synchronous motor, the rotor hub 3 with the permanent magnet 16 starts to rotate as one body with the connection member 8 and the outer ring 5. That is, the rotor hub 3 is borne by the compound ball bearing 4 through the connection member 8 to rotate about the fixed shaft 10.

The first embodiment thus configured exhibits the following effects.

In the fixed shaft type spindle motor 1 in which the fixed shaft 10 is vertically installed on the base 2 and the rotor hub 3 is supported to freely rotate by the fixed shaft 10 through the compound ball bearing 4, the outer ring 5 of the compound ball bearing 4 is fixed to the rotor hub 3 through the connection member 8; and therefore, the rotor hub 3 being one of the two counterparts (the rotor hub 3 being the component on the rotating side and the base 2 as the component on the fixing side) that mount the compound ball bearing 4 can be made up without the inner peripheral surface of a wall, which has conventionally been regarded as necessary to fit the outer ring 5 of the compound ball bearing 4 to the rotor hub 3. As a result, the stress resulting from the shape precision (circularity, cylindricality, surface roughness) of the inner peripheral surface of the wall, or the stress caused by the press fitting, adhesion, or press-fit adhesion as the method of mounting the bearing does not exist; accordingly disappear bad influences on the precision of the rolling surfaces of the inner and outer rings 6, 5 through the outer peripheral surface of the outer ring 5 of the compound ball bearing 4, so that the reliability of the run-out accuracy/NRR0, the noises, and the acoustic life, etc., of the spindle motor 1 can be enhanced.

Further, the rotor hub 3 being one of the two counterparts that mount the compound ball bearing 4 can be configured without the inner peripheral surface of the wall, which has conventionally been regarded as necessary to fit the outer ring 5 of the compound ball bearing 4 to the rotor hub 3; and therefore, the adhesion groove for filling adhesives and the run-off groove that are formed conventionally on the inner peripheral surface of the wall become unnecessary, which reduces the man-hour to lower the manufacturing cost.

Further, since the compound ball bearing 4, the fixed shaft 10, and the connection member 8 are assembled in advance into one assembly unit, fastening the fixed shaft 10 to the base 2 being the other one of the two counterparts that mount the bearing assembly and fastening the smaller diameter portion 8b of the connection member 8 to the rotor hub 3 being the one will achieve to assemble the compound ball bearing 4 between these two counterparts, thus the mounting work of the compound ball bearing 4 becomes extremely easy to perform.

Since the inner ring portion (6) belonging to the lower half unit ball bearing portion of the two unit ball bearing portions constituting the compound ball bearing 4 is formed integrally with the fixed shaft 10, assembling the compound ball bearing 4, the fixed shaft 10, and the connection member 8 in advance into one assembly unit as described above will produce a still greater merit, with regard to the inner ring 6 of the compound ball bearing 4. Assuming that these components are not assembled in advance, to mount the compound ball bearing 4 to the fixed shaft 10 with the inner ring portion (6) integrally formed will lead to a troublesome work that inserts the balls (rolling elements) 7 between the outer ring 5 and the fixed shaft 10. Consequently, the mounting work of the compound ball bearing 4 will become still more complicated and difficult.

Figure 3:
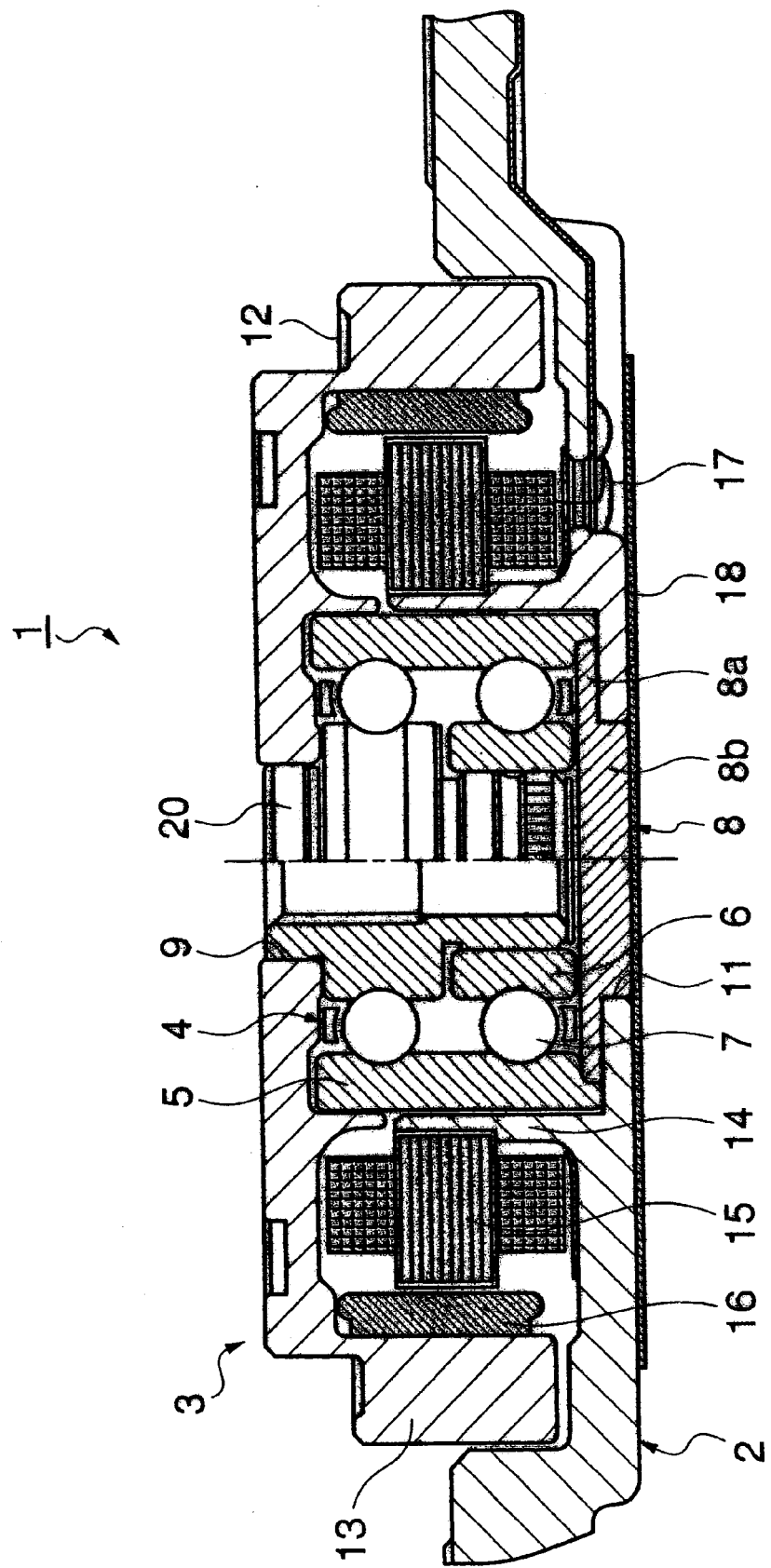
FIG. 3 is a sectional view of a rotary shaft type spindle motor in the second embodiment of the invention.
Figure 4:
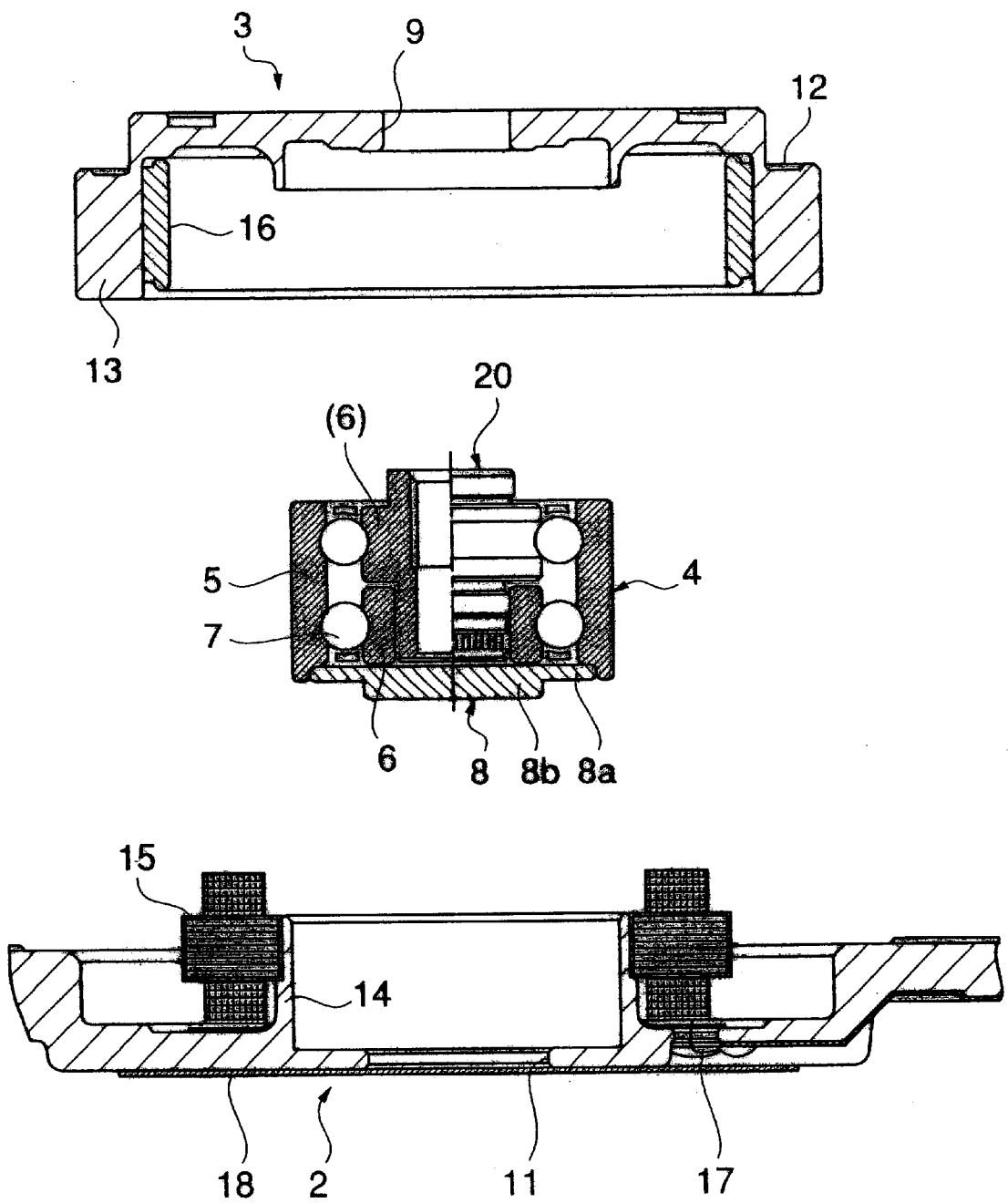
FIG. 4 is an exploded view of the same.

Next, the second embodiment of the invention will be described with reference to FIG. 3 and FIG. 4. FIG. 3 is a sectional view of a rotary shaft type spindle motor of the second embodiment, and FIG. 4 is an exploded view of the same. The parts corresponding to those of the fixed shaft type spindle motor in the first embodiment are given the same symbols.

As shown in FIG. 3 and FIG. 4, a rotary shaft type spindle motor 1 relating to the second embodiment has a rotary shaft 20 installed vertically downward on the rotor hub 3, in which the rotary shaft 20 is fixedly engaged with the central circular hole 9 on the rotor hub 3. The inner ring 6 of the lower half unit ball bearing portion of the compound ball bearing 4 is applied from the outside to the lower reduced diameter portion of the rotary shaft 20 in FIG. 3 to be fixedly engaged therewith. The inner ring 6 (the portion illustrated by (6) in the drawing) of the upper half unit ball bearing portion of the compound ball bearing 4 is formed integrally with the rotary shaft 20.

The outer ring 5 of the compound ball bearing 4 is formed commonly integrally throughout the whole structure of the compound ball bearing 4. On the lower end of the outer ring 5 is formed a step portion made by enlarging the inner diameter thereof. The larger diameter portion 8a of the stepped top-form connection member 8 (without a rotary shaft) having the larger diameter portion 8a and the smaller diameter portion 8b is fixedly engaged with the step portion formed on the lower end of the outer ring 5 with the larger diameter portion 8a applied from the inside to the step portion. The smaller diameter portion 8b of the connection member 8 is fixedly engaged with the central circular hole 11 of the flange base 2 with the smaller diameter portion 8b applied from the inside to the central circular hole 11. Further, the larger diameter portion 8a is seated on an inner surface surrounding the central circular hole 11 of the base 2, however it is not necessarily seated in this manner.

Figure 10:
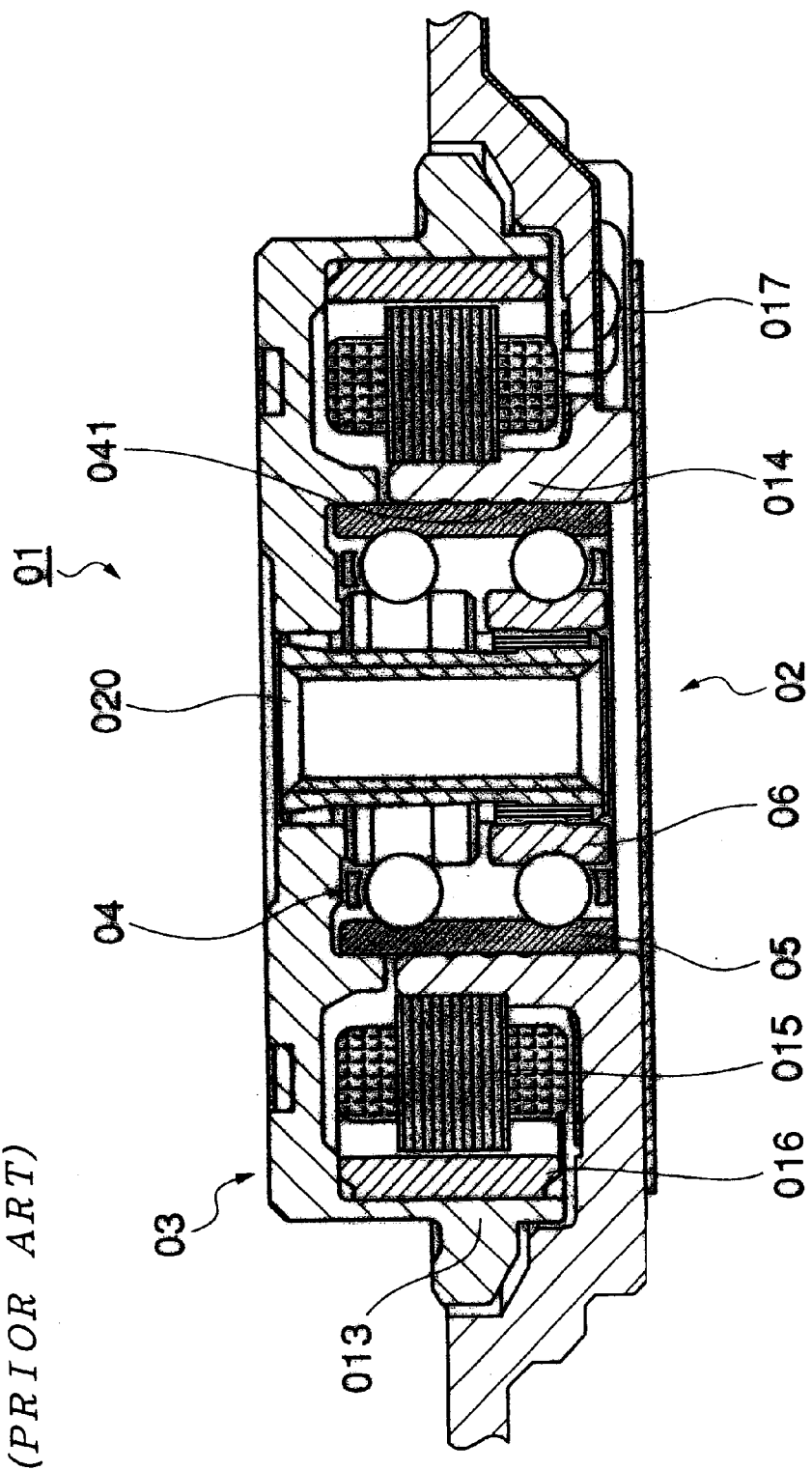
FIG. 10 is a sectional view of a conventional rotary shaft type spindle motor using the compound ball bearing.

Therefore, since the base 2, connection member 8, and the outer ring 5 of the compound ball bearing 4 are coupled in one unit, the base 2 supports the rotary shaft 20 of the rotor hub 3 to freely rotate through the connection member 8 and the compound ball bearing 4. And, since the outer ring 5 of the compound ball bearing 4 is fixed to the base 2 through the connection member 8, the inner peripheral surface of a wall (refer to the inner peripheral surface of the inner cylindrical wall 014 of the base 02 in FIG. 10), which has conventionally been regarded as necessary to fit the outer ring 5 of the compound ball bearing 4 to the base 2, becomes unnecessary, so that the base 2 is not provided with such inner peripheral surface. The base 2 has the inner cylindrical wall 14 formed upright thereon, and the inner cylindrical wall 14 has an inner peripheral surface facing to the outer peripheral surface of the outer ring 5. However, the outer ring 5 is not fixedly engaged with this inner peripheral surface of the inner cylindrical wall 14.

In the second embodiment, the rotary shaft 20, the compound ball bearing 4, and the connection member 8 are integrally assembled in advance as a product, as shown in FIG. 4. With the bearing assembly thus produced, the projected end of the rotary shaft 20 thereof is fixedly engaged with the central circular hole 9 of the rotor hub 3, and the smaller diameter portion 8b of the connection member 8 is fixedly engaged with the central circular hole 11 of the base 2, whereby the rotary shaft type spindle motor 1 of the second embodiment is made up.

The second embodiment is different from the first embodiment in terms of the foregoing points, however it is not different in the other points of the internal structure of the compound ball bearing 4, the structure of the motor, and so forth; and the detailed description will be omitted.

As the second embodiment is configured as above, when the power is supplied from the feeder part 17 connected to the flexible printed circuit board 37 to the windings of the stator 15, the rotor hub 3 with the permanent magnet 16 starts to rotate as one body with the rotary shaft 20 and the inner ring 6. The base 2 supports the rotary shaft 20 of the rotor hub 3 to freely rotate through the connection member 8 and the compound ball bearing 4.

The second embodiment thus configured exhibits the following effects.

In the rotary shaft type spindle motor 1 in which the rotary shaft 20 is vertically installed on the rotor hub 3 and is supported to freely rotate through the compound ball bearing 4 on the base 2, the outer ring 5 of the compound ball bearing 4 is fixed to the base 2 through the connection member 8; and therefore, the base 2 being the other one of the two counterparts (the rotor hub 3 being the component on the rotating side and the base 2 as the component on the fixing side) that mount the compound ball bearing 4 can be made up without the inner peripheral surface of a wall, which has conventionally been regarded as necessary to fit the outer ring 5 of the compound ball bearing 4 to the base 2. As a result, the stress resulting from the shape precision (circularity, cylindricality, surface roughness) of the inner peripheral surface of the wall, or the stress caused by the press fitting, adhesion, or press-fit adhesion as the method of mounting the bearing does not exist; accordingly disappear bad influences on the precision of the rolling surfaces of the inner and outer rings 6, 5 through the outer peripheral surface of the outer ring 5 of the compound ball bearing 4, so that the reliability of the run-out accuracy/NRR0, the noises, and the acoustic life, etc., of the spindle motor 1 can be enhanced.

Further, the base 2 being the other one of the two counterparts that mount the compound ball bearing 4 can be configured without the inner peripheral surface of the wall, which has conventionally been regarded as necessary to fit the outer ring 5 of the compound ball bearing 4 to the base 2; and therefore, the adhesion groove and the run-off groove that are formed conventionally on the inner peripheral surface of the wall become unnecessary, which reduces the man-hour to lower the manufacturing cost.

Further, since the compound ball bearing 4, the rotary shaft 20, and the connection member 8 are assembled in advance into one assembly unit, fastening the rotary shaft 20 to the rotor hub 3 being the one of the two counterparts that mount the bearing assembly and fastening the smaller diameter portion 8b of the connection member 8 to the base 2 being the other one will achieve to assemble the compound ball bearing 4 between these two counterparts, thus the mounting work of the compound ball bearing 4 becomes extremely easy to perform. In the other aspects, the second embodiment also exhibits the same effects as those by the bearing assembly in the first embodiment.

Figure 5:
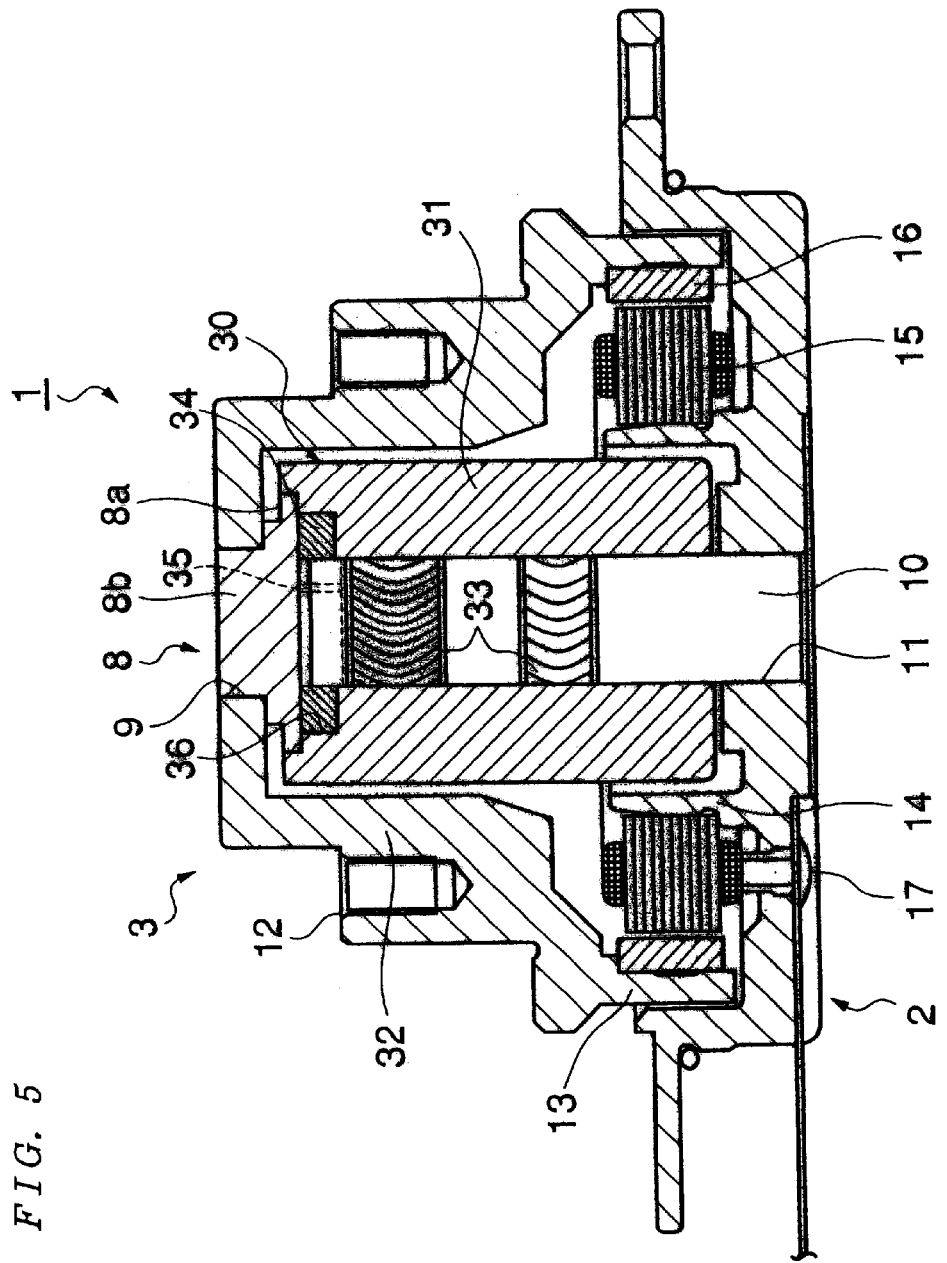
FIG. 5 is a sectional view of a fixed shaft type spindle motor in the third embodiment of the invention.
Figure 6:
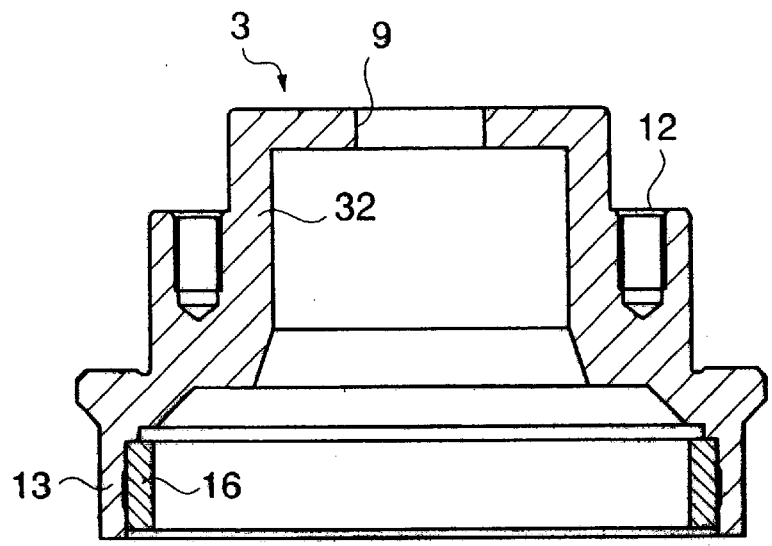
FIG. 6 is an exploded view of the same.
Figure 6:
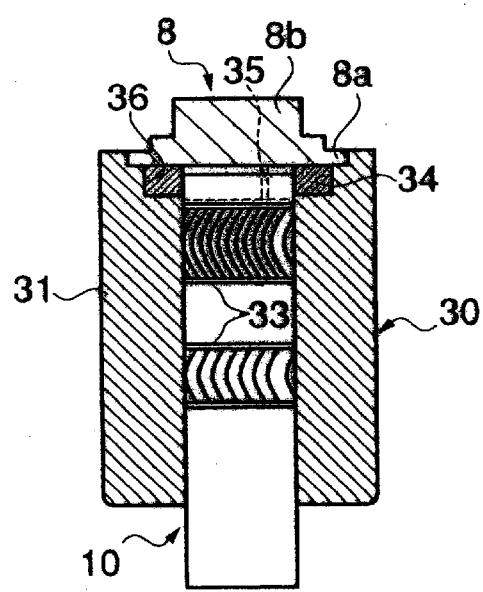
Figure 6:
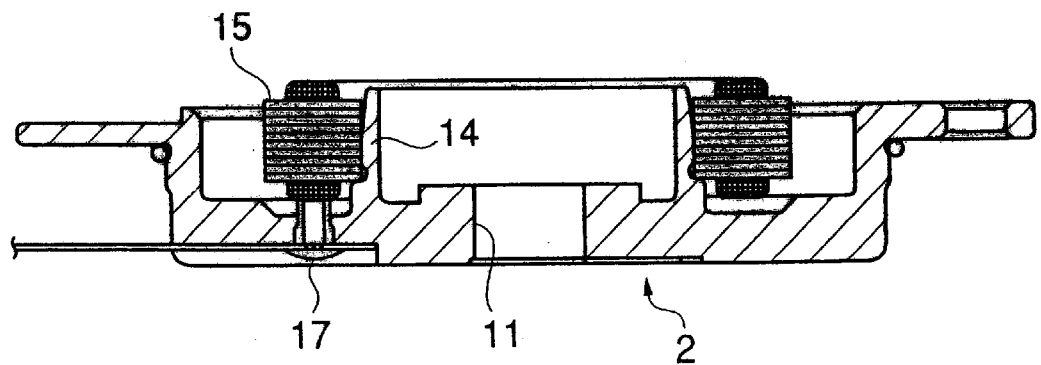

Next, the third embodiment of the invention will be described with reference to FIG. 5 and FIG. 6. FIG. 5 is a sectional view of the fixed shaft type spindle motor of the third embodiment, and FIG. 6 is an exploded view of the same. The parts corresponding to those of the fixed shaft type spindle motor in the first embodiment are given the same symbols.

As shown in FIG. 5 and FIG. 6, the fixed shaft type spindle motor 1 relating to the third embodiment has the fixed shaft 10 installed upright (vertically upward) on the flange base 2, in which the fixed shaft 10 is fixedly engaged with the central circular hole 11 on the flange base 2. Also, the fixed shaft 10 is sheathed with a sleeve 31 of a fluid bearing 30.

The sleeve 31 of the fluid bearing 30 is made of a cylindrical member of a slightly thick wall, and has the step portion formed on the upper end thereof, which is made by enlarging comparably greatly the inner diameter thereof. The larger diameter portion 8a of the stepped top-form connection member 8 (without a rotary shaft) having the larger diameter portion 8a and the smaller diameter portion 8b is fixedly engaged with the step portion formed on the upper end of the sleeve 31 with the larger diameter portion 8a applied from the inside to the step portion. The smaller diameter portion 8b of the connection member 8 is fixedly engaged with the central circular hole 9 of the rotor hub 3 with the smaller diameter portion 8b applied from the inside to the central circular hole 9.

Therefore, since the rotor hub 3, connection member 8, and the sleeve 31 of the fluid bearing 30 are coupled in one unit, the rotor hub 3 is supported to freely rotate by the fixed shaft 10 of the base 2 through the connection member 8 and the fluid bearing 30. And, since the sleeve 31 of the fluid bearing 30 is fixed to the rotor hub 3 through the connection member 8, the inner peripheral surface of a wall, which has conventionally been regarded as necessary to fit the sleeve 31 of the fluid bearing 30 to the rotor hub 3, becomes unnecessary, so that the rotor hub 3 is not provided with such inner peripheral surface. The rotor hub 3 has an inner peripheral surface facing to the outer peripheral surface of the sleeve 31 of the fluid bearing 30 on the circumferential wall 32 of the central smaller diameter portion thereof. However, the sleeve 31 is not fixedly engaged with this inner peripheral surface of the circumferential wall 32.

A magnetic disk (not shown) is mounted on the mounting plane 12 of the rotor hub 3. The other rotating bodies requiring a high run-out accuracy/NRR0 and/or low noises can be mounted thereon.

A lubricating oil is filled up in the gap between the sleeve 31 of the fluid bearing 30 and the fixed shaft 10 so as not to leak out. The fixed shaft 10 has herringbone grooves 33 formed on the outer circumferential surface thereof at two places separated in the axial direction. As described later, as the rotor hub 3 rotates, the pressure of the lubricating oil in the herringbone grooves 33 rises, whereby the sleeve 31 is floated up from the fixed shaft 10. Here, a gaseous lubricant may replace the lubricating oil.

A cylindrical thrust ring 34 is fixedly engaged with an upper end of the fixed shaft 10 by the press fitting. The thrust ring 34 is accommodated in a concave space surrounded by the inner surface of the connection member 8 and a step portion 36 that is formed by enlarging comparably small the inner diameter of the upper end of the sleeve 31. When the sleeve 31 rotates integrally with the rotor hub 3, the thrust ring 34 rotates in the concave space relatively to the sleeve 31.

Although not detailed in the drawing, herringbones similar to the herringbones 33 formed on the outer circumferential surface of the fixed shaft 10 are formed on an edge surface of the thrust ring 34. And, since the lubricating oil is supplied into a gap between the edge surface and the inner surface of the connection member 8 that faces to the edge surface, as the thrust ring 34 rotates relatively to the sleeve 31, the herringbones effect to raise the pressure of the lubricating oil, which floats the connection member 8 up from the edge surfaces of the thrust ring 34 and the fixed shaft 10. In this manner, the thrust force acting on the connection member 8 is received by the fixed shaft 10, finally by the base 2.

And, although not detailed in the drawing, herringbones are formed on the lower edge surface of the sleeve 31. And, since the lubricating oil is supplied into a gap between the lower edge surface of the sleeve 31 and the inner surface near the central circular hole 11 of the base 2, as the sleeve 31 rotates integrally with the rotor hub 3, the herringbones formed on the lower edge surface of the sleeve 31 effect to raise the pressure of the lubricating oil, which floats the sleeve 31 up from the base 2. In this manner, the base 2 also receives the thrust force acting on the sleeve 31.

Further, these thrust bearing structures may be used at the same time, or one of these may be omitted.

Although not detailed in the drawing, the lubricating oils that each lubricate a radial bearing portion (the sliding portion between the fixed shaft 10 and the sleeve 31) of the fluid bearing 30 and thrust bearing portions (the contacting/sliding portion between the thrust ring 34 and the connection member 8, and the contacting/sliding portion between the sleeve 31 and the base 2) communicate mutually, and there is formed a closed circulating passage that circulates the lubricating oils in a single direction with the rotation of the sleeve 31.

The stator 15 is mounted on the outer peripheral surface of the inner cylindrical wall 14 of the base 2, and the permanent magnet 16 is mounted on the inner peripheral surface of the outer circumferential wall 13 of the rotor hub 3 so as to face the outer peripheral surface of the stator 15. The symbol 17 denotes a feeder part to the windings of the stator 15, which is connected to the flexible printed circuit board 37.

In the third embodiment, the fixed shaft 10, the fluid bearing 30, the connection member 8, and the thrust ring 34 are integrally assembled in advance as a product, as shown in FIG. 6. With the bearing assembly thus produced, the projected end of the fixed shaft 10 thereof is fixedly engaged with the central circular hole 11 of the base 2, and the smaller diameter portion 8b of the connection member 8 is fixedly engaged with the central circular hole 9 of the rotor hub 3, whereby the fixed shaft type spindle motor 1 of the third embodiment is made up.

As the third embodiment is configured as above, when the power is supplied from the feeder part 17 connected to the flexible printed circuit board 37 to the windings of the stator 15, the rotor hub 3 with the permanent magnet 16 starts to rotate as one body with the connection member 8 and the sleeve 31. That is, the rotor hub 3 is borne by the fluid bearing 30 through the connection member 8 to rotate about the fixed shaft 10.

The third embodiment thus configured exhibits the following effects.

In the fixed shaft type spindle motor 1 in which the fixed shaft 10 is vertically installed on the base 2 and the rotor hub 3 is supported to freely rotate by the fixed shaft 10 through the fluid bearing 30, the sleeve 31 of the fluid bearing 30 is fixed to the rotor hub 3 through the connection member 8; and therefore, the rotor hub 3 being the one of the two counterparts (the rotor hub 3 being the component on the rotating side and the base 2 as the component on the fixing side) that mount the fluid bearing 30 can be made up without the inner peripheral surface of a wall, which has conventionally been regarded as necessary to fit the sleeve 31 of the fluid bearing 30 to the rotor hub 3. As a result, there does not exist the stress resulting from the shape precision (circularity, cylindricality, surface roughness) of the inner peripheral surface of the wall, or the stress caused by the press fitting, adhesion, or press-fit adhesion as the method of mounting the bearing; accordingly disappear bad influences on the precision of the sliding surfaces of the sleeve 31 and the fixed shaft 10 and the clearance between the sliding surfaces of the two to be ensured at a constant quantity through the outer peripheral surface of the sleeve 31 of the fluid bearing 30, so that the reliability of the run-out accuracy/NRR0, the noises, the acoustic life, and the rigidity, etc., of the spindle motor 1 can be enhanced.

Further, the rotor hub 3 being the one of the two counterparts that mount the fluid bearing 30 can be configured without the inner peripheral surface of the wall, which has conventionally been regarded as necessary to fit the sleeve 31 of the fluid bearing 30 to the rotor hub 3; and therefore, the adhesion groove and the run-off groove that are formed conventionally on the inner peripheral surface of the wall become unnecessary, which reduces the man-hour to lower the manufacturing cost.

Further, since the fluid bearing 30, the fixed shaft 10, the connection member 8, and the thrust ring 34 are assembled in advance into one assembly unit, fastening the fixed shaft 10 to the base 2 being the other one of the two counterparts that mount the bearing assembly and fastening the smaller diameter portion 8b of the connection member 8 to the rotor hub 3 being the one will achieve to assemble the fluid bearing 30 between these two counterparts, thus the mounting work of the fluid bearing 30 becomes extremely easy to perform. Here, the lubricating oil is to be filled up after finishing the mounting work.

Figure 7:
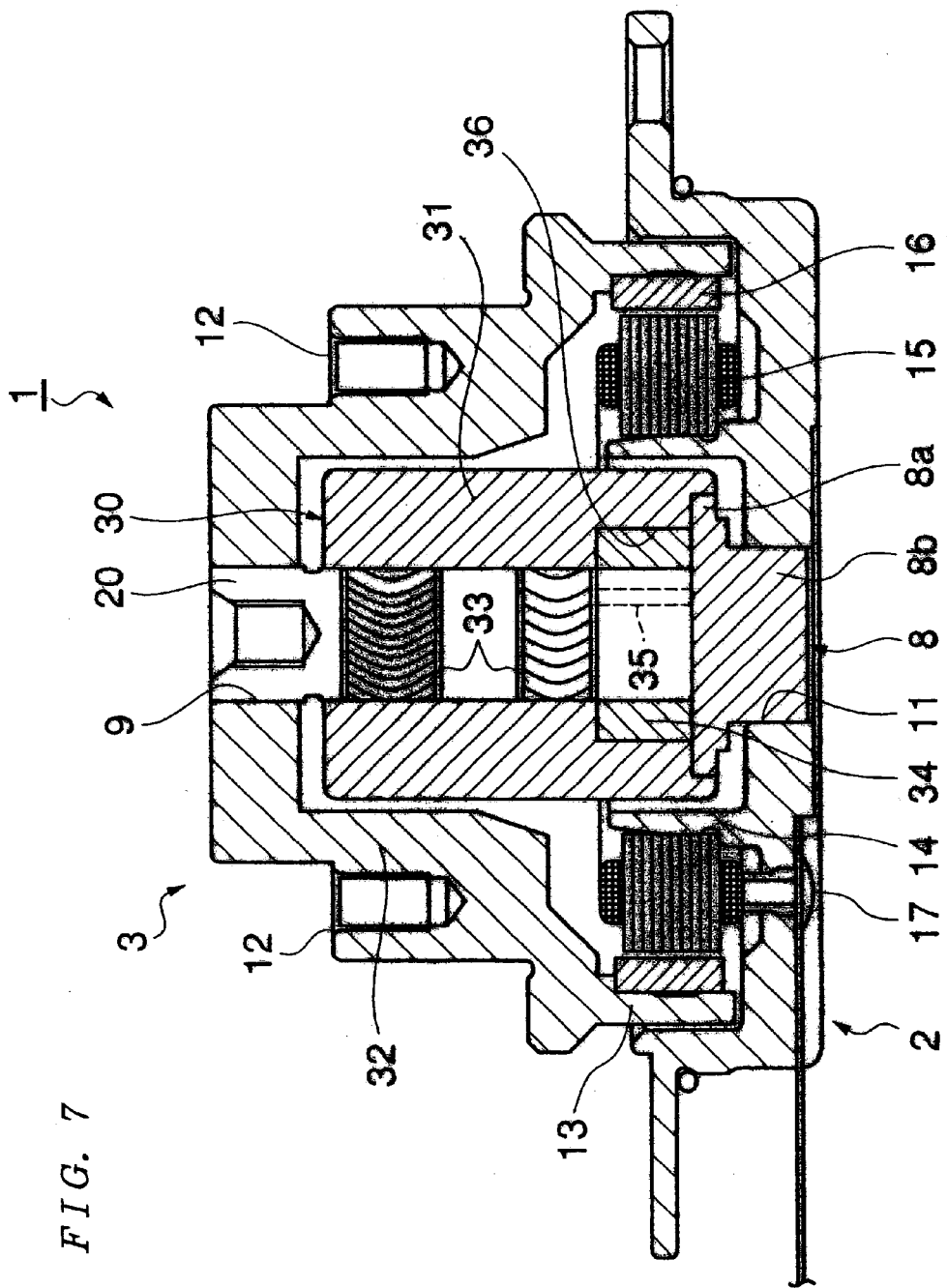
FIG. 7 is a sectional view of a rotary shaft type spindle motor in the fourth embodiment of the invention.
Figure 8:
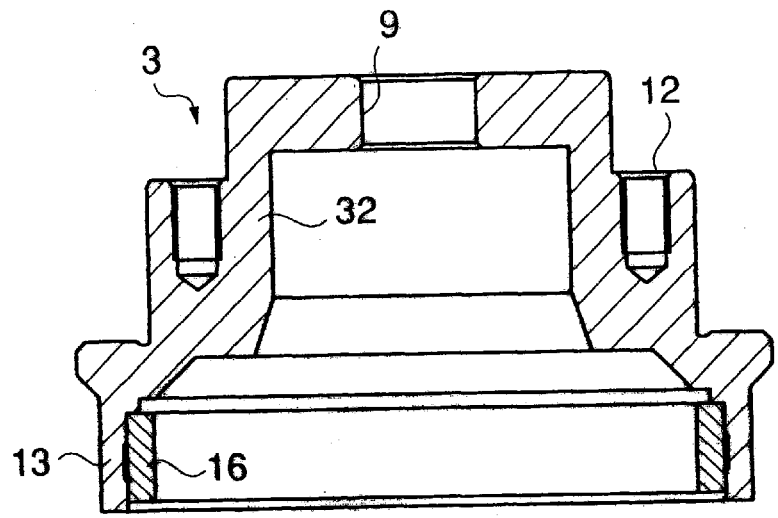
FIG. 8 is an exploded view of the same.
Figure 8:
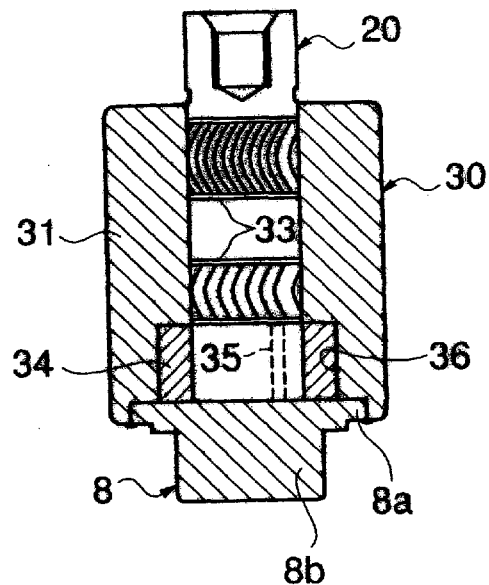
Figure 8:
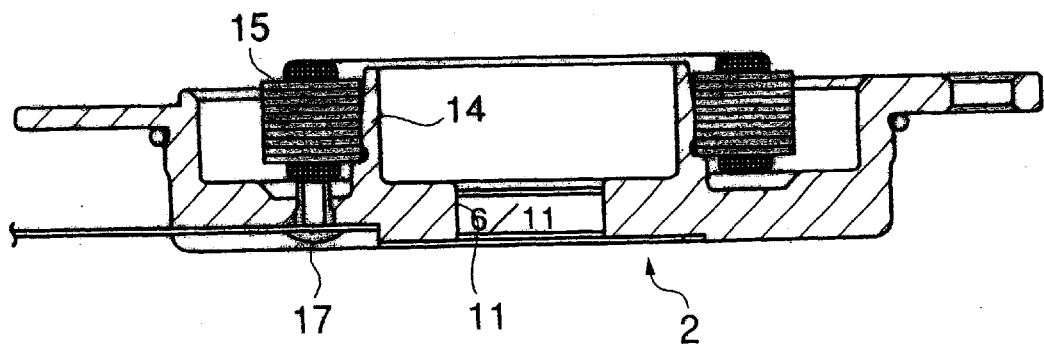

Next, the fourth embodiment of the invention will be described with reference to FIG. 7 and FIG. 8. FIG. 7 is a sectional view of a rotary shaft type spindle motor of the fourth embodiment, and FIG. 8 is an exploded view of the same. The parts corresponding to those of the rotary shaft type spindle motor in the second embodiment and those of the fixed shaft type spindle motor in the third embodiment are given the same symbols.

As shown in FIG. 7 and FIG. 8, the rotary shaft type spindle motor 1 relating to the fourth embodiment has the rotary shaft 20 installed vertically downward on the rotor hub 3, in which the rotary shaft 20 is fixedly engaged with the central circular hole 9 on the rotor hub 3. Also, the rotary shaft 20 is sheathed with the sleeve 31 of the fluid bearing 30.

The sleeve 31 of the fluid bearing 30 is made of a cylindrical member of a slightly thick wall, and has the step portion formed on the lower end thereof, which is made by enlarging the inner diameter thereof comparably greatly. The larger diameter portion 8a of the stepped top-form connection member 8 (without a rotary shaft) having the larger diameter portion 8a and the smaller diameter portion 8b is fixedly engaged with the step portion formed on the lower end of the sleeve 31 with the larger diameter portion 8a applied from the inside to the step portion. The smaller diameter portion 8*b* of the connection member 8 is fixedly engaged with the central circular hole 11 of the base 2 with the smaller diameter portion 8*b* applied from the inside to the central circular hole 11.

Figure 11:
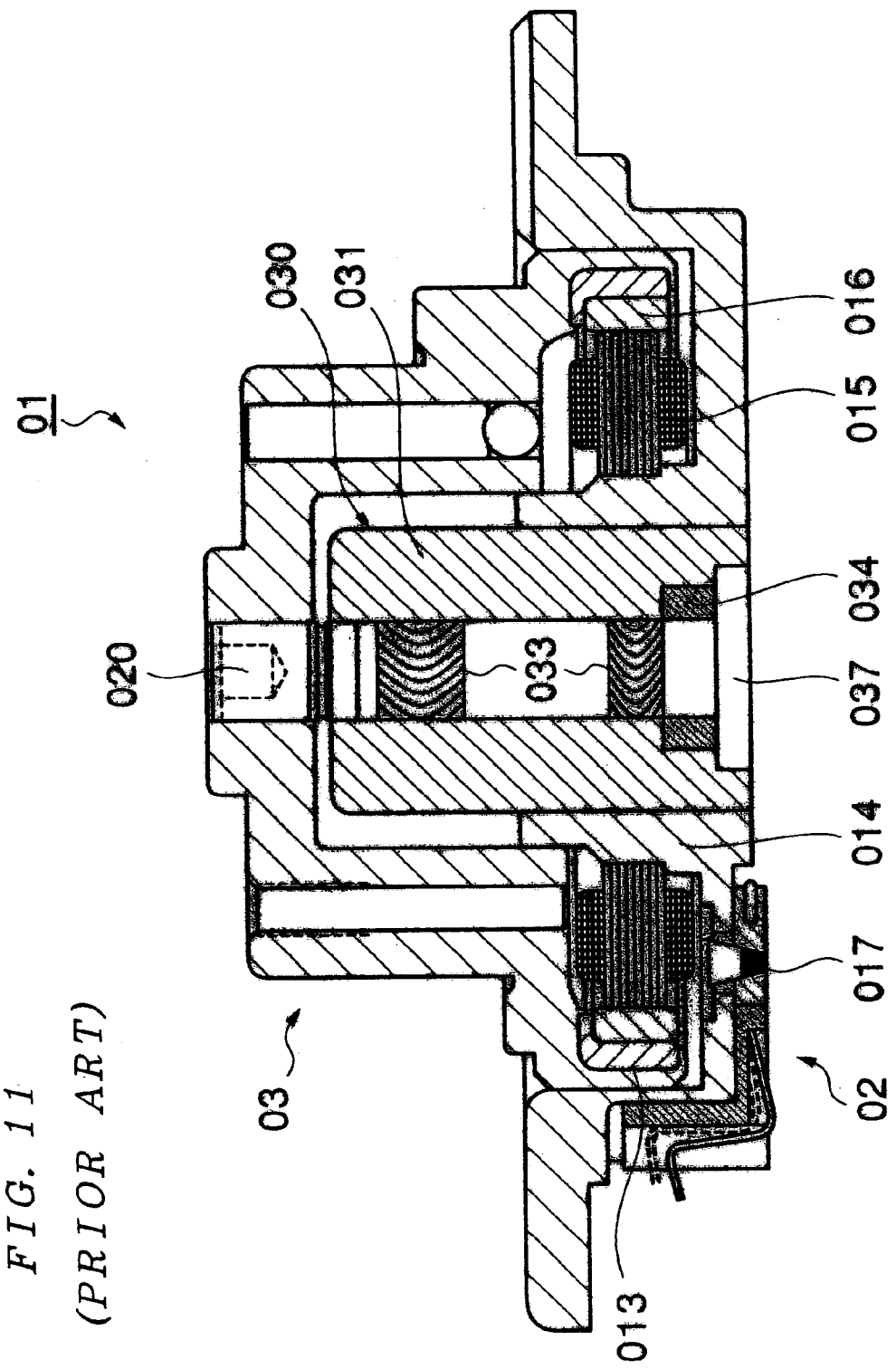
FIG. 11 is a sectional view of a conventional rotary shaft type spindle motor using the fluid bearing.

Therefore, since the base 2, connection member 8, and the sleeve 31 of the fluid bearing 30 are coupled in one unit, the base 2 supports the rotary shaft 20 of the rotor hub 3 to freely rotate through the connection member 8 and the sleeve 31 of the fluid bearing 30. And, since the sleeve 31 of the fluid bearing 30 is fixed to the base 2 through the connection member 8, the inner peripheral surface of a wall (refer to the inner peripheral surface of the inner cylindrical wall 014 of the base 02 in FIG. 11), which has conventionally been regarded as necessary to fit the sleeve 31 of the fluid bearing 30 to the base 2, becomes unnecessary, so that the base 2 is not provided with such inner peripheral surface. The base 2 has the inner cylindrical wall 14 formed upright thereon, and the cylindrical wall 14 has an inner peripheral surface facing to the outer peripheral surface of the sleeve 31. However, the sleeve 31 is not fixedly engaged with this inner peripheral surface of the cylindrical wall 14.

The cylindrical thrust ring 34 is fixedly engaged with a lower end of the rotary shaft 20 by the press fitting. The thrust ring 34 is accommodated in a concave space surrounded by the inner surface of the connection member 8 and the step portion 36 that is formed by enlarging comparably small the inner diameter of the lower end of the sleeve 31. When the rotary shaft 20 rotates, the thrust ring 34 rotates in the concave space integrally with the rotary shaft 20.

Although not detailed in the drawing, herringbones similar to the herringbones 33 formed on the outer circumferential surface of the rotary shaft 20 are formed on the edge surface of the thrust ring 34. And, since the lubricating oil is supplied into a gap between the edge surface and the inner surface of the connection member 8 that faces to the edge surface, as the thrust ring 34 rotates integrally with the rotary shaft 20, the herringbones effect to raise the pressure of the lubricating oil, which floats the rotary shaft 20 and the thrust ring 34 up from the inner surface of the connection member 8. In this manner, the thrust force acting on the rotary shaft 20 is received.

Although not detailed in the drawing, the lubricating oils that each lubricate the radial bearing portion (the sliding portion between the rotary shaft 20 and the sleeve 31) of the fluid bearing 30 and the thrust bearing portion (the contacting/sliding portion between the thrust ring 34 and the connection member 8) communicate mutually, and there is formed a closed circulating passage that circulates the lubricating oils in a single direction with the rotation of the rotary shaft 20. A through hole 35 shows a part of the passage.

In the fourth embodiment, the rotary shaft 20, the fluid bearing 30, the connection member 8, and the thrust ring 34 are integrally assembled in advance as a product, as shown in FIG. 8. With the bearing assembly thus produced, the projected end of the rotary shaft 20 thereof is fixedly engaged with the central circular hole 9 of the rotor hub 3, and the smaller diameter portion 8*b* of the connection member 8 is fixedly engaged with the central circular hole 11 of the base 2, whereby the rotary shaft type spindle motor 1 of the fourth embodiment is made up.

The fourth embodiment is different from the third embodiment in terms of the foregoing points, however it is not different in the other points; and the detailed description will be omitted.

As the fourth embodiment is configured as above, when the power is supplied from the feeder part 17 to the windings of the stator 15, the rotor hub 3 with the permanent magnet 16 starts to rotate as one body with the rotary shaft 20. The base 2 supports the rotary shaft 20 of the rotor hub 3 to freely rotate through the connection member 8 and the fluid bearing 30.

The fourth embodiment thus configured exhibits the following effects.

In the rotary shaft type spindle motor 1 in which the rotary shaft 20 is vertically installed on the rotor hub 3 and is supported to freely rotate through the fluid bearing 30 on the base 2, the sleeve 31 of the fluid bearing 30 is fixed to the base 2 through the connection member 8; and therefore, the base 2 being the other one of the two counterparts (the rotor hub 3 being the component on the rotating side and the base 2 as the component on the fixing side) that mount the fluid bearing 30 can be made up without the inner peripheral surface of a wall, which has conventionally been regarded as necessary to fit the sleeve 31 of the fluid bearing 30 to the base 2. As a result, there does not exist the stress resulting from the shape precision (circularity, cylindricality, surface roughness) of the inner peripheral surface of the wall, or the stress caused by the press fitting, adhesion, or press-fit adhesion as the method of mounting the bearing; accordingly disappear bad influences on the precision of the sliding surfaces of the sleeve 31 and the rotary shaft 20 and the clearance between the sliding surfaces of the two to be ensured at a constant quantity through the outer peripheral surface of the sleeve 31 of the fluid bearing 30, so that the reliability of the run-out accuracy/NRR0, the noises, the acoustic life, and the rigidity, etc., of the spindle motor 1 can be enhanced.

Further, the base 2 being the other one of the two counterparts that mount the fluid bearing 30 can be configured without the inner peripheral surface of the wall, which has conventionally been regarded as necessary to fit the sleeve 31 of the fluid bearing 30 to the base 2; and therefore, the adhesion groove and the run-off groove that are formed conventionally on the inner peripheral surface of the wall become unnecessary, which reduces the man-hour to lower the manufacturing cost.

Further, since the fluid bearing 30, the rotary shaft 20, the connection member 8, and the thrust ring 34 are assembled in advance into one assembly unit, fastening the rotary shaft 20 to the rotor hub 3 being the one of the two counterparts that mount the bearing assembly and fastening the smaller diameter portion 8*b* of the connection member 8 to the base 2 being the other one will achieve to assemble the fluid bearing 30 between these two counterparts, thus the mounting work of the fluid bearing 30 becomes extremely easy to perform. Here, the lubricating oil is to be filled up after finishing the mounting work.

In the first through fourth embodiments, it is assumed that the bearing assemblies each are applied to the spindle motors each; however, they can be applied preferably to various rotating machines that require a high run-out accuracy/NRRO and/or low noises.

As many apparently widely different embodiments of the present invention can be made without departing from the spirit and scope thereof, it is to be understood that the invention is not limited to the specific embodiments thereof except as defined in the appended claims.

What is claimed is:

1. A bearing assembly comprising:

a compound ball bearing including inner and outer rings, said inner ring fixed to a shaft; and a cylindrical connector connected to said outer ring, said cylindrical connector having an outer cylindrical surface which is stepped to form a first diameter portion and a second diameter portion having a diameter smaller than said first diameter portion, said first diameter portion being fixed to one end of said outer ring.

2. A bearing assembly according to claim 1 wherein said cylindrical connector and said inner and outer rings are coaxial.

3. A bearing assembly according to claim 1 wherein said cylindrical connector has at least two steps in its outer cylindrical surface forming said first diameter portion, said second diameter portion and a third diameter portion located between said first and second diameter portions.

4. A bearing assembly according to claim 1 wherein one end of said outer ring has a cylindrical recess, said first diameter portion being fitted within said recess.

* * * * *